United States Patent Office 3,331,654
Patented July 18, 1967

3,331,654
PROCESS FOR DYEING BLENDS OF CELLULOSE AND POLYESTER FIBERS WITH REACTIVE AND DISPERSE DYES
Hans Husy, Basel, Switzerland, assignor to Sandoz Ltd. (also known as Sandoz A.G.), Basel, Switzerland
No Drawing. Filed Dec. 12, 1963, Ser. No. 329,969
Claims priority, application Switzerland, Dec. 17, 1962, 14,806/62; Dec. 20, 1962, 14,970/62; Dec. 28, 1962, 15,235/62
14 Claims. (Cl. 8—21)

It has been found that mixtures of loose or spun filaments or fibers of natural or regenerated cellulose and of polyester fibers can be dyed with notably good success in one bath with reactive and disperse dyes which are stable to alkalis at temperatures above 100° C., when dyeing is carried out at temperatures above 100° C. with the addition of not more than 5 grams of a basic fixing agent per liter liquor and in the presence of at least one neutral salt.

The natural celluloses which come into consideration for the process are, e.g., cotton, linen, hemp, jute and ramie. The term regenerated cellulose refers to viscose rayon in the filament and staple fiber forms and to cuprammonium rayon. Filaments and fibers of these materials, as well as fiber fleeces, woven and knitted fabrics and other textile materials made from them, can be dyed by the new process, which belongs to the group of exhaustion dyeing processes. The filaments or fibers are dyed as loose mixtures with polyester fibers, in particular those made from hydrophobic polycondensation products of terephthalic acid and glycols or 1,4-bis (-hydroxymethyl)-benzene, or in the form of blended fabrics of cellulosic and polyester fibers. The dyebath contains reactive dyes for the natural or regenerated cellulose and disperse dyes for the polyester fiber present in the mixture.

In the present context reactive and disperse dyes which are stable to alkalis at temperatures above 100° C. are understood to be those dyes which are not damaged at temperatures of 110–140° C. in aqueous solutions whose pH value, measured at 20° C., is at least 8.5.

Reactive dyes of this type contain a substituent capable of forming a chemical linkage with the substrate, e.g. a halogen atom, preferably a chlorine or bromine atom, which is readily cleavable as an anion or a group which is readily cleavable as an anion, e.g. —O—SO$_3$H, or a C—C multiple linkage readily capable of addition. They may belong to the azo, metallized azo, anthraquinone, phthalocyanine or nitro series and contain, bound through an oxygen or sulfur atom or through a monosubstituted or unsubstituted imino group, at least one group, e.g. a di- or tri-chloro- or di- or tri-bromo-pyrimidyl group, a 2,4-dichloro-6-methyl-, 2,4-dibromo-6-methyl-, 2,4 - dichloro- or 2,4 - dibromo-pyrimidyl - 5 - methylene group, or a group bound through an oxygen or a sulfur atom or a substituted or unsubstituted imino group and having the formula

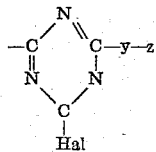

wherein

Hal represents chlorine or bromine,
y represents an oxygen or sulfur atom or a substituted or unsubstituted imino group, and
z represents hydrogen or a substituted or unsubstituted alkyl, cycloalkyl, aryl or aralkyl radical; or a β-chloropropionyl, a β-sulfatopropionyl or acrylyl group bound through a monosubstituted or unsubstituted imino group.

Dyes of the above type are described in the following patents: French Patent 1,221,621 (dichloro- and dibromo-pyrimidylamino radical); Belgian Patent 578,742, Austrian Patent 214,546 (trichloro- or tribromo-pyrimidyl-amino radical); Belgian Patent 589,972 (2,4-dichloro- or 2,4 - dibromo - 6 - methylpyrimidyl - 5 - methyleneamino radical); Belgian Patents 559,944; 559,945; 560,734; 563,864; 560,791 to 560,795 (4-monohalogeno-1,3,5-triazinyl-2 radical substituted in the 6 position); Belgian Patents 565,279; 616,439; 576,104; 576,105; French Patent 1,203,580, and U.S. Patent 3,007,762 (β-chloropropionylamino radical); Belgian Patents 565,279; 565,447; 572,862; 582,944; 583,050; 596,925; 617,961, and Swiss Patent 365,814 (acrylylamino radical).

The preferred reactive dyes are those which exhaust on cellulose to a practically acceptable degree from a bath containing a neutral salt. This is a general working rule for the textile colorist and signifies that dyes are used which exhaust onto cellulose in the presence of about 20 grams or more of sodium sulfate or sodium chloride per liter of the dyeliquor.

The disperse dyes used can belong, for example, to the monoazo, disazo, anthraquinone, nitro, styryl or phthaloquinone series. They form stable dispersions in the alkaline dyeliquors at the dyeing temperature and possess good affinity for polyester fibers and good light fastness on polyester fibers. Their melting points are almost invariably higher than 100° C., in general above 140° C. [Journal of the Society of Dyers and Colourists 70, table on pages 69–71 (1954) and 74, page 389, Discussion (1958)]. Their solubility in water at 80° C. is generally at the most 100 mg./liter, i.e. 1:10,000 [Journal of the Society of Dyers and Colourists, 70, 69–71 (1954)] and preferably between about 0.2 and 50 mg./liter. They contain no ionizing groups such as —COOH and —SO$_3$H and no groups which are readily converted into —COOH or —SO$_3$H under the dyeing conditions, and also are free from groups which, if split off during the dyeing process, would be detrimental to the affinity for polyester fibers, and to the shade or the fastness properties, e.g. light or washing fastness, of the dyeings.

Disperse dyes of the above type are disclosed in the following publications:

Can. Textile J., 76 (9) 49–59 (1959)
Journal of the Society of Dyers and Colourists, 70, 68–75 (1954)
Journal of the Society of Dyers and Colourists, 75, 141–147 (1959)
American Dyestuff Reporter, 48, (14) 35–47 (1959)
American Dyestuff Reporter, 49, (15) 600–605 (1960)
Ullmann, Enzyklopädie der technischen Chemie, volume 3, pp. 726–8 (1953), anthraquinone dyes; volume 4, pp. 128–9 (1953), azo-dyes.
French Patents 1,167,704, 1,177,337, 1,207,000, 1,220,-194, 1,222,237, 1,226,501, 1,237,149, 1,264,972, 1,280,-998, 1,281,023, 1,291,988, 1,261,580, and French additional Patents 75,125, 76,452, 78,167, azo dyes
French Patents 1,163,682, 1,218,936, 1,225,449, anthraquinone dyes,
French Patent 1,129,460, nitro dyes
German Patent 677,641, styryl dyes.

The basic fixing agents can be defined as compounds whose aqueous dilute solutions at 20° C. show a pH-value of at least 8.5. Examples of such basic fixing agents are sodium, potassium or lithium hydroxide, sodium or potassium carbonate, sodium or potassium bicarbonate, trisodium phosphate or a sodium or potassium silicate in which the molecular ratio SiO$_2$:Na$_3$O or K$_2$O may vary from 1:1 to 3.5:1, e.g. a sodium or potassium metasilicate or sodium or potassium water glass.

When sodium or potassium bicarbonate is used, it is decomposed into sodium or potassium carbonate and carbonic acid under the conditions of dyeing, so that the pH-value in the dyeliquor is appreciably higher than at room temperature.

Dyeing is carried out at temperatures above 100° C., e.g. 110–140° C., or preferably at 120–130° C., and at a liquor ratio of about 1:4 to 1:20, or preferably 1:5 to 1:10. The amount of the basic fixing agent used is governed by the amount of the reactive dye employed and must be so calculated that the total amount of the halogen halide liberated during fixation is bound. It is preferable to employ the basic fixing agent in amounts slightly in excess over the amount theoretically necessary, so that the dyeing medium remains of alkaline reaction up to the end of the dyeing process. Allowance must be made for the fact that at short liquor ratios, e.g. 1:4 to about 1:8, and with high concentrations of reactive dye, e.g. 5 to 10% on the weight of the material, the amount of basic fixing agent per liter must be greater than at medium or long liquor ratios. Generally an addition of only 0.5 to 2 grams sodium carbonate or trisodium phosphate or 0.5 to 1 gram sodium hydroxide per liter dyeliquor is sufficient, when dyeing is carried out at a liquor ratio of 1:10. The dyed fibers or fabrics are rinsed in the usual way, washed if necessary with soap and sodium carbonate or with an anionic or nonionic detergent and sodium carbonate, rinsed again and dried. The dyeings are of full depth and have good fastness to light, sublimation, heat setting and dry cleaning, and excellent fastness to water, washing at temperatures up to 100° C., perspiration and rubbing.

An important advantage of this process is that at the most only 5 grams, or preferably 0.5–2 grams, of a basic fixing agent per liter dyeliquor is necessary in order to fix the reactive dye on the cellulosic fiber. On the other hand, it is very surprising that polyester fibers can be dyed with disperse dyes in an alkaline dyeliquor without the dye being aggregated and precipitated or adversely affected in some other way, since polyester fibers are normally dyed from a neutral or acid medium, e.g. in the presence of benzoic acid or a mixture of sodium orthophenylphenolate and an excess of ammonium sulfate or ammonium phosphate. [See J. Soc. Dyers and Col. 75 146 (1959): Kirk and Othmer Encyclopedia of Chemical Technology, First Supplement (1957) pages 267–8.]

In the following examples the parts and percentages are by weight and the temperatures in degrees centigrade.

Example 1

A dyebath is prepared with 1000 parts of water, 2 parts of sodium 3-nitrobenzene-sulfonate, 1 part of calcined sodium carbonate, 80 parts of calcined sodium sulfate, 1 part of the dye of Example 2 of Belgian Patent 596,941 which has the formula

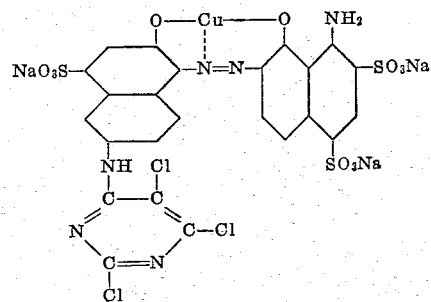

(A)

and 3 parts of a dyeing preparation containing 1 part of sodium dinapthylmethanedisulfonate, 0.5 part of sodium cetyl sulfate, 0.5 part of sodium sulfate and 1 part of a disperse dye mixture of a hydroxyphenyl- and an alkoxyphenyl-1,5-dihydroxy-4,8 - diaminoanthraquinone as disclosed in Example 43 of French Patent 1,218,936.

100 parts of a blended fabric consisting of 67 parts of polyester fiber (polyethyleneterephthalate), and 33 parts of cotton are entered into the bath at 40°. The circulating bath is raised to 130° in 45 minutes, maintained at this temperature for 1 hour and in the course of the next 20 minutes cooled to 60°. The dyed fabric is rinsed in cold and hot water, soaped at the boil for 20 minutes in a 0.2% soap solution in distilled water, rinsed again in hot and cold water and dried. The blue dyeing is fast to light, washing, water, perspiration and rubbing.

When the blue disperse dye mixture named above is replaced by one of the red disperse dyes of Examples 1, 2, 4 or 5 of French Patent 1,163,682 which have the formula

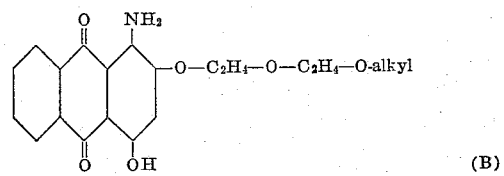

(B)

or by the violet disperse dye 1-hydroxy-4-phenylaminoanthraquinone [Am. Dyest. Rep., 49, 604, column 2 (1960); Canadian Textile J., 76 (9), 57 (1959), dye No. 21] or by one of the yellow dyes of the formulae

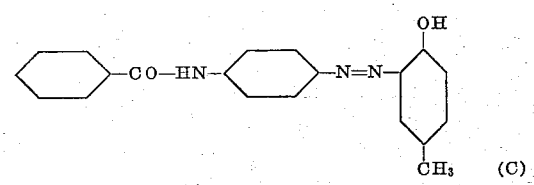

(C)

(Example 1 of French Patent 1,177,377)
or

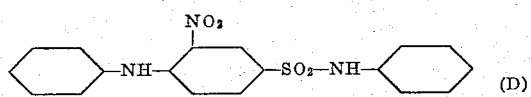

(D)

(Am. Dyest. Rep., 49, 604, column 2 (1960)), violet, violet-blue or green dyeings fast to light and wet treatments are obtained.

By replacing the calcined sodium carbonate by the same amount of calcined potassium carbonate, anhydrous lithium carbonate, calcined sodium or potassium metasilicate equally good dyeings are obtained.

Example 2

A dyebath is prepared with 800 parts of water, 2 parts of sodium 3-nitrobenzene-sulfonate, 0.5 part of calcined trisodium phosphate, 60 parts of calcined sodium sulfate, 0.7 part of the dye of Example 13 of Swiss Patent 361,066 having the formula

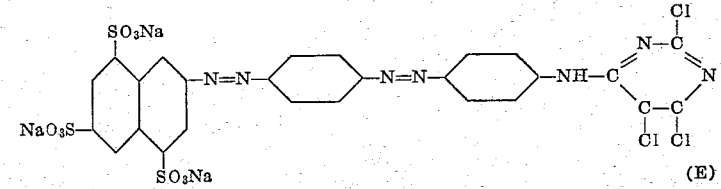

(E)

and 3 parts of a dyeing preparation containing 1 part of lignin-sulfonate, 0.5 part of sodium cetyl sulfate, 0.5 part of sodium sulfate and 1 part of the red disperse dye of Example 4 of French Patent 1,163,682. 50 parts of cotton fabric and 50 parts of polyester fabric are entered into this dyebath. The bath is circulated and raised to 130° in 30 minutes, maintained at this temperature for 45 minutes and then cooled to 60° in the course of 20 minutes.

The dyed fabrics are rinsed in cold and hot water, soaped at the boil for 20 minutes, in an aqueous solution containing 2 grams of sodium dodecylbenzenesulfonate per liter, rinsed again in hot and cold water, and dried. The cotton fabric is dyed orange and the polyester fabric bluish-red; both dyeings have good light fastness and very good wet fastness properties.

When a blended fabric of cotton and polyester fiber in the ratio 1:1 is dyed in this bath, a reddish brown-orange shade is obtained.

Example 3

A dyebath is prepared with 1000 parts of water, 2 parts of sodium 3-nitrobenzene-sulfonate, 2 parts of calcined sodium carbonate, 60 parts of sodium chloride, 0.6 part of sodium 2-[4′-(4″-chloro-6″-amino-1″,3″,5″-triazinyl-2″-amino)-2′-acetylamino-phenylazo-]-naphthalene - 4,8-disulfonate [Belgian Patent 560,792, Example 2, and Collection of Czechoslovak Chemical Communications 25, 2794 (1960)], and 1 part of a dyeing preparation containing 35% 1-hydroxy-4-phenylamino-anthraquinone, 30% sodium dinaphthylmethane-disulfonate, 15% sodium cetyl-oleylsulfate and 20% sodium sulfate.

100 parts of a blended fabric of 67% polyester fiber and 33% cotton are introduced into this bath at 40°. The circulating bath is heated to 130° in 45 minutes, maintained at this temperature for 30 minutes and cooled to 60° over the next 20 minutes. The dyed fabric is rinsed in cold and hot water, soaped at the boil for 20 minutes, rinsed again in hot and cold water and dried. The violet-grey dyeing is fast to light, washing, water, perspiration and rubbing.

Example 4

100 parts of a blended fabric of polyester fiber and cotton in the ratio 2:1 are entered into a bath at 40° consisting of 1000 parts of water, 2 parts of sodium 3-nitrobenzenesulfonate, 1 part of calcined sodium carbonate, 60 parts of calcined sodium sulfate, 0.7 part of sodium 1-hydroxy-2-(4′-acetylaminophenylazo)-6-[4″-chloro-6″-phenylamino-1″,3″,5″-triazinyl-2″-amino]-naphthalene-2,′,2′″,3-trisulfonate [Belgian Patent 560,973, Example 5; Collection of Czechoslovak Chemical Communications 25, 2794–5 (1960)] and 2 parts of the blue disperse dye preparation used in Example 1. The circulating liquor is heated to 130° in 45 minutes, maintained at this temperature for 30 minutes and cooled to 60° over the next 20 minutes. The dyed fabric is rinsed in cold and hot water, soaped at the boil for 20 minutes, rinsed again in hot and cold water and dried. The violet dyeing is fast to wet treatments.

The sodium carbonate can be replaced by the equivalent amount of anhydrous trisodium phosphate or by 0.5 part of sodium hydroxide, or by 3 parts of a 34% sodium waterglass solution in which the molecular ratio of $SiO_2:Na_2O$ is 3.3:1 or by 5 parts of a 30% potassium waterglass solution in which the molecular ratio $SiO_2:K_2O$ is 3.6:1.

Example 5

100 parts of a blended fabric of 67% polyester fiber and 33% viscose staple fiber are entered into a dyebath at 40° consisting of 700 parts of water, 2 parts of sodium 3-nitrobenzene-sulfonate, 80 parts of calcined sodium sulfate, 0.5 part of sodium hydroxide, 0.6 part of the dye of formula

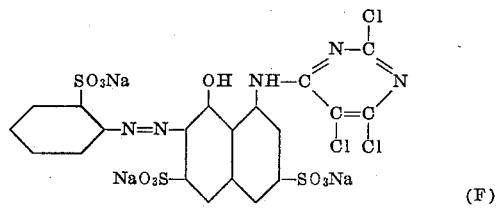

(F)

(Belgian Patent 578,742, Example 10) and 2 parts of the blue disperse dye preparation used in Example 1. The circulating liquor is heated to 130° in 30–45 minutes, maintained at this temperature for 45 minutes and cooled to 60° in the next 15 minutes. The dyed fabric is rinsed with cold and hot water, soaped for 20 minutes at the boil, rinsed again in hot and cold water and dried. The violet dyeing obtained has very good wet fastness properties and good light fastness.

Equally good results are obtained with 1 part of calcined sodium carbonate or 1 part of calcined trisodium phosphate in place of sodium hydroxide.

Example 6

A dyebath is prepared at 40° with 1000 parts of water, 1 part of sodium 3-nitrobenzene-sulfonate, 1 part of calcined sodium carbonate, 50 parts of calcined sodium sulfate, 0.8 part of the dye of the formula

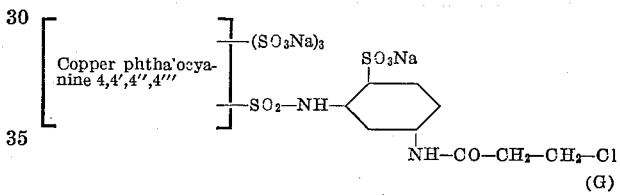

(G)

(German Patent 1,058,467, Example 6) and 2 parts of a dyeing preparation consisting of 0.7 part of the yellow dye of formula (C), 0.7 part of sodium dinaphthylmethane-disulfonate, 0.3 part of sodium cetyl sulfate and 0.3 part of sodium sulfate. 100 parts of a blended fabric of 67 parts of polyester fiber and 33 parts of cotton are entered into this bath. The circulating liquor is heated to 130° C. in 45 minutes, maintained at this temperature for 30 minutes and cooled to 60° in the course of 20 minutes. The dyed fabric is rinsed in cold and hot water, soaped at the boil for 20 minutes, rinsed again in hot and cold water and dried. The green dyeing is fast to light, washing, perspiration, water and rubbing.

In place of sodium carbonate, 1 part of anhydrous trisodium phosphate or 0.5 part of sodium hydroxide or 2 parts of sodium or potassium bicarbonate or 1.5 parts of potassium carbonate can be used.

Example 7

A dyebath is prepared with 1200 parts of water, 2 parts of sodium 3-nitrobenzene-sulfonate, 0.6 part of sodium hydroxide, 60 parts of calcined sodium sulfate, 0.7 part of the dye (E) described in Example 2 and 3 parts of the red dyeing preparation described in the same Example 2. 100 parts blended fabric of cotton and polyester fiber in the ratio 1:2 are entered into this bath, which is circulated and raised to 120° in 20 minutes, maintained at this temperature for 60 minutes and then cooled to 60° in the course of about 15 minutes.

The dyed fabric is rinsed in cold and hot water, soaped at the boil in an aqueous solution containing per liter 1 gram of a carboxymethylated alkylpolyglycol ether and 1 gram of calcined sodium carbonate, rinsed again and dried. A brown-orange dyeing having good light fastness and excellent wet fastness properties is obtained.

The 0.6 part of sodium hydroxide can be replaced by 0.4–0.5 part of lithium hydroxide or 0.8–0.9 part of potassium hydroxide with equal success.

Example 8

A dyebath is prepared with 1500 parts of water, 3 parts of sodium 3-nitrobenzene-sulfonate, 2 parts of calcined sodium carbonate, 60 parts of sodium chloride, 0.8 part of sodium 2-[4'-(4''-chloro-6''-amino-1'',3'',5''-triazinyl-2'' - amino) - 2' - acetylamino - phenylazo] - naphthalene-4,8-disulfonate [Belgian Patent 560,792 - Example 2, and Collection of Czechoslovak Chemical Communications 25, 2794 (1960)], and 1.3 parts of a dyeing preparation containing 35% 1-hydroxy-4-phenylaminoanthraquinone, 30% sodium dinaphthylmethane-disulfonate, 15% sodium cetyl-oleylsulfate and 20% sodium sulfate.

100 parts of a blended fabric of 67% polyester fiber and 33% cotton are introduced into this bath at 40°. The circulating bath is heated to 140° in 30 minutes, maintained at this temperature for 15 minutes and cooled to 50° in about 20 minutes. The dyed fabric is finished in the manner described in Example 7. The violet-grey dyeing is fast to light, washing, water, perspiration and rubbing.

Example 9

A dyebath is prepared with 500 parts of water, 1 part of sodium 3-nitrobenzene-sulfonate, 2 parts of sodium carbonate, 30 parts of sodium sulfate, 4 parts of the dye of formula

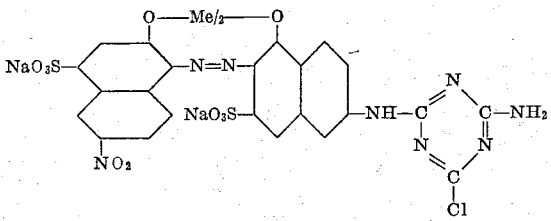

Me being a 1:1 mixture of chromium and cobalt (Ullmann, Enzyclopädie der technischen Chemie, vol. 14 (1963), page 618) and 4 parts of a dyeing preparation containing 40% of the dye mixture of Example 17 of the French Patent 1,261,580, 20% of sodium dinaphthylmethanedisulfonate, 20% of sodium cetyl sulfate and 20% of anhydrous sodium sulfate.

100 parts of a blended fabric consisting of 50% polyester fiber and 50% cotton are entered into the bath at 40°. The bath is circulated, raised to 125° in the course of 30 minutes, and held for 60 minutes at the same temperature. After cooling to 60–70° the dyed fabric is removed from the bath, rinsed with cold and with hot water, soaped at the boil for 15 minutes with an aqueous solution containing 2 grams of sodium larurylpolyglycol ether sul-

TABLE

| Ex. | (I) Reactive Dye | (II) Amount (parts) | (III) Disperse Dye | (IV) Amount (parts) | (V) Procedure of Example | (VI) Shade of Dyeing on Blended Fabric |
|---|---|---|---|---|---|---|
| 10 | Dye A (Example 1) | 0.8 | Dye C (Example 1) | 0.40 | 1 | Green. |
| 11 | Cibacron Brilliant Orange G-E Coll. Czechosl. 25, 2794 (1960). | 0.5 | 1-hydroxy-4-phenylamino-anthraquinone | 0.35 | 4 | Red-violet. |
| 12 | Belgian Patent 578,742, Example 229 | 0.6 | Dye B (Example 1) | 0.35 | 1 | Do. |
| 13 | Belgian Patent 578,742, Example 5 | 0.7 | Dye D (Example 1) | 0.7 | 1 | Yellowish-green. |
| 14 | French Patent 1,221,621, Example 2 | 0.7 | ....do | 0.7 | 1 | Do. |
| 15 | Belgian Patent 589,972, Example 93 | 0.65 | Dye C (Example 1) | 0.4 | 1 | Green. |
| 16 | Belgian Patent 589,972, Example 123 | 0.5 | Blue dye mixture of Example 1 | 0.3 | 1 | Bluish violet. |
| 17 | Belgian Patent 589,972, Example 99 | 0.8 | French Patent 1,261,589, Example 19 | 0.8 | 2 | Navy blue. |
| 18 | French Patent 1,221,621, Example 30 | 0.5 | 1-(4'-hydroxyphenylazo)-4-phenylazo-benzene C.I. Disperse Yellow 23 (26070) | 0.5 | 5 | Orange. |
| 19 | German Patent 1,058,467, Example 7 | 0.6 | French Patent 1,118,155, Example 1 | 0.4 | 6 | Blue-violet. |
| 20 | German Patent 1,058,467, Example 3 | 1 | ....do | 1 | 2 | Yellowish-green. |
| 21 | Intermediate Product of Example 1 of Belgian Patent 616,439. | 0.5 | C.I. Disperse Yellow 23 (26070) | 0.4 | 6 | Green. |
| 22 | French Patent 1,203,580, Example 8 | 0.9 | French Patent 1,237,149, Example 2 | 0.5 | 6 | Red. |
| 23 | Cibacron Blue 3G-A Coll. Czechosl. 25, 2796 (1960). | 0.7 | French Patent 1,167,704, Example 8 | 0.5 | 2 | Violet. |
| 24 | Cibacron Black BG-A Coll. Czechosl. 25, 2797 (1960). | 2 | French Patent 1,261,580, Example 17 | 2 | 9 | Grey-black. |
| 25 | Cibacron Brown 3GR-A Coll. Czechosl. 25, 2798 (1960). | 1 | French Patent 1,291,988, Example 1 | 1 | 2 | Brown. |
| 26 | Belgian Patent 578,742, Example 197 | 0.7 | 1-hydroxy-4-phenylamino-anthraquinone | 0.3 | 3 | Brownish violet. |
| 27 | French Patent 1,221,621, Example 91 | 0.5 | French Patent 1,291,988, Example 1, last paragraph. | 0.4 | 3 | Orange-brown. |
| 28 | ....do | 0.5 | French Patent 1,280,998, Example 2 | 0.6 | 5 | Brownish orange. |
| 29 | Belgian Patent 578,742, Example 19 | 0.6 | French Patent 1,253,848, Example 1 | 0.4 | 1 | Blue. |
| 30 | French Patent 1,221,621, Example 179 | 0.4 | French Patent 1,226,501, Example 4 | 0.3 | 1 | Brown. |
| 31 | Belgian Patent 578,742, Example 176 | 0.7 | French Patent 1,220,194, Example 3 | 0.5 | 1 | Violet. |
| 32 | French Patent 1,225,281, Example 7 | 0.6 | French Patent 1,129,460, Example 1 | 0.6 | 1 | Orange-yellow. |
| 33 | Belgian Patent 578,742, Example 1 | 0.8 | French Patent 1,264,972, Example 2 | 0.4 | 1 | Yellow. |
| 34 | Belgian Patent 578,742, Example 8 | 1.2 | 1-hydroxy-4-phenylamino-anthraquinone | 1.5 | 1 | Violet. |
| 35 | Dye E (Example 2) | 0.8 | Canad. Text. J. 76 (9) 55 (1959) Example 11. | 0.5 | 1 | Orange. |
| 36 | ....do | 0.5 | French Additional Patent 75,125, Example 1. | 0.5 | 1 | Do. |
| 37 | Cibacron Rubine R-A Coll. Czechosl. 25, 2795 (1960). | 0.7 | French Patent 1,281,023, Example 3 | 0.35 | 1 | Red-violet. |
| 38 | Belgian Patent 578,742, Example 201 | 0.5 | French Patent 1,291,988, Example 70 | 0.3 | 2 | Grey. |
| 39 | French Patent 1,221,621, Example 91 | 0.5 | Dye C (Example 1) | 0.4 | 2 | Orange-yellow. |
| 40 | Belgian Patent 578,742, Example 5 | 0.7 | Hydroxy-quinophthalone Can. Text. J. 76 (9) p. 54 No. 3 (1959). | 0.7 | 1 | Yellowish-green. |
| 41 | Cibacron Turquoise Blue G-E Coll. Czech. 25 2797 (1960). | 0.6 | ....do | 0.7 | 1 | Do. |
| 42 | Dye A (Example 1) | 0.8 | Nitro-acridone Am. Dyest. Rep. 48 (14) p. 44 Col. 1, 1959. | 0.7 | 1 | Green. |
| 43 | Cibacron Brilliant Red B-A Coll. Czech. 25 2795 (1960). | 0.5 | ....do | 0.9 | 1 | Orange. |
| 44 | French Patent 1,211,086, Dye No. 18 of the Table. | 0.4 | French Patent 1,291,988, Example 82 | 0.3 | 7 | Greenish grey. |
| 45 | Belgian Patent 578,742, Example 87 | 0.5 | C.I. Disperse Yellow 23 (26070) | 0.6 | 8 | Reddish yellow. |
| 46 | Belgian Patent 578,742, Example 246 | 0.4 | French Patent 1,167,704, Example 8 | 0.7 | 1 | Scarlet. |
| 47 | French Additional Patent 75,033, Example 1. | 0.4 | Nitro-acridone Am. Dyest. Rep. 48 (14) p. 44 Col. 1 (1959). | 0.5 | 1 | Yellow. |
| 48 | French Patent 1,211,086, Example 6 | 0.6 | French Patent 1,291,988, Example 82 | 0.4 | 1 | Greenish grey. |
| 49 | French Patent 1,268,684, Example 4 | 0.4 | Dye B (Example 1) | 0.6 | 3 | Red. |
| 50 | French Patent 1,268,684, Example 5 | 0.4 | Dye C (Example 1) | 0.6 | 4 | Reddish yellow. |
| 51 | French Patent 1,268,685, Example 2 | 0.5 | Dye D (Example 1) | 0.8 | 1 | Green. | fate (about 3 ethenoxy groups) per liter, rinsed again and dried. The obtained greyish black dyeing is fast to light and to wet treatments.

The above table contains further examples of dyeings which were obtained according to the particulars given in Examples 1 to 9. The individual examples are characterized by the nature and amount of the dyes used, the procedure according to one the Examples 1 to 9, and the shade of the dyeing obtained on a blended fabric of 67% polyester fiber and 33% cotton [columns (I) to VI] respectively. The parts of dye given in the table are the amounts of pure dye that are required for dyeing 100 parts of blended fabric. The reactive dyes contain only small amounts of sodium chloride or sulfate, whereas the disperse dyes are employed in the form of dyeing preparations consisting of 35% dye, 35% sodium dinaphthylmethanedisulfonate, 15% sodium cetyl sulfate and 15% sodium sulfate.

Having thus disclosed the invention what I claim is:

1. A process for dyeing a mixture of cellulosic and polyester fibers in one alkaline bath with reactive dye and with disperse dye, which dyes are stable to alkali at temperatures above 100° C., which process consists of dyeing the mixture within the temperature range of from 110° to 140° C. and at a goods-to-liquor ratio of from 1:4 to 1:20 in the presence of a neutral salt and of at most 5 grams per liter of a basic fixing agent whose dilute aqueous solution possesses at 20° C. a pH-value of at least 8.5.

2. A process according to claim 1, wherein the mixture of cellulosic and polyester fibers is in the form of a blended fabric.

3. A process according to claim 1, wherein said temperature range is from 120° to 130° C.

4. A process according to claim 1, wherein the basic fixing agent is a member selected from the group consisting of sodium hydroxide, potassium hydroxide, lithium hydroxide, sodium carbonate, potassium carbonate, sodium bicarbonate, potassium bicarbonate, trisodium phosphate, sodium metasilicate, potassium metasilicate, sodium waterglass and potassium waterglass.

5. A process according to claim 4, wherein said basic fixing agent comprises from 0.5 to 2 grams of anhydrous sodium carbonate per liter of dyeliquor.

6. A process according to claim 4, wherein said basic fixing agent comprises from 0.5 to 2 grams of anyhdrous trisodium phosphate per liter of dyeliquor.

7. A process according to claim 4, wherein said basic fixing agent comprises from 0.5 to 1 gram of sodium hydroxide per liter of dyeliquor.

8. A process according to claim 1, wherein the reactive dye employed contains a radical selected from the group consisting of dichloropyrimidyl, trichloropyrimidyl-, dichloropyrimidyl-methylene and methyl-dichloropyrimidyl-methylene, the said radical being bound through a bridge member selected from the group consisting of —O—, —NH— and —N—(lower alkyl)—.

9. A process according to claim 1, wherein the reactive dye employed contains a radical of the formula

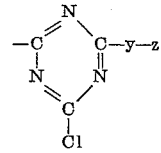

wherein y is a member selected from the group consisting of —O—, —NH— and —N—(lower alkyl)—, and z is a member selected from the group consisting of hydrogen, lower alkyl, sulfophenyl and disulfophenyl, the said radical being bound through a bridge member selected from the group consisting of —O—, —NH— and —N—(lower alkyl)—.

10. A process according to claim 1, wherein the reactive dye employed contains a radical selected from the group consisting of β-chloropropionyl, β-sulfatopropionyl and acrylyl, the said radical being bound through a bridge member selected from the group consisting of —NH— and —N—(lower alkyl)—.

11. A process according to claim 1, wherein the reactive dye employed is selected from the group consisting of · azo dye, metallized azo dye, anthraquinone dye, phthalocyanine dye and nitro dye.

12. A process according to claim 1, wherein the disperse dye employed is selected from the group consisting of monoazo dye, disazo dye, anthraquinone dye, nitro dye, styryl dye and phthaloquinone dye.

13. Mixtures of cellulosic fiber and polyester fiber dyed according to the process claimed in claim 1.

14. Blended fabric of cellulosic fiber and polyester fiber dyed according to the process claimed in claim 2.

References Cited

UNITED STATES PATENTS

| | | | |
|---|---|---|---|
| 3,093,437 | 6/1963 | Merian et al. | 8—21 |
| 3,100,132 | 8/1963 | Jenny et al. | 8—21 X |
| 3,137,687 | 6/1964 | Spoerri et al. | |
| 3,156,519 | 11/1964 | Kallman et al. | 8—55 |
| 3,164,436 | 1/1965 | Altermatt | 8—21 X |

FOREIGN PATENTS

| | | |
|---|---|---|
| 1,297,776 | 5/1962 | France. |
| 887,437 | 1/1962 | Great Britain. |

NORMAN G. TORCHIN, *Primary Examiner.*

J. HERBERT, *Assistant Examiner.*

UNITED STATES PATENT OFFICE
CERTIFICATE OF CORRECTION

Patent No. 3,331,654  
July 18, 1967

Hans Husy

It is hereby certified that error appears in the above numbered patent requiring correction and that the said Letters Patent should read as corrected below.

Column 1, lines 57 to 63, the formula should appear as shown below instead of as in the patent:

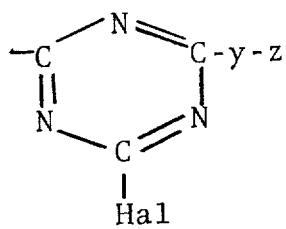

column 2, line 40, the last word should be -- or --; column 4, lines 68 to 75, the extreme right-hand portion of the formula should appear as shown below instead of as in the patent:

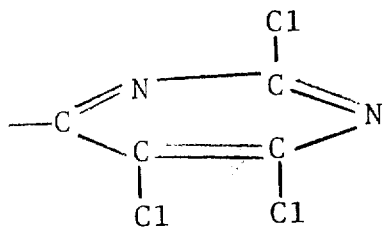

column 5, line 52, for "-2,′,2‴,3-trisulfonate [Belgian Patent 560,973" read -- -2′,2‴,3-trisulfonate [Belgian Patent 560,793 --; column 6, lines 30 to 35, the indistinct word should be -- phthalocyanine --; columns 7 and 8, in the table, fourth column, line 2 thereof, for "-pheny amino-" read -- -phenylamin --; column 9, line 8, after "one" insert -- of --.

Signed and sealed this 6th day of August 1968.

(SEAL)  
Attest:

EDWARD M. FLETCHER, JR.  
Attesting Officer

EDWARD J. BRENNER  
Commissioner of Patents